United States Patent [19]

Stowe

[11] Patent Number: 4,514,054
[45] Date of Patent: Apr. 30, 1985

[54] QUADRATURE FIBER-OPTIC INTERFEROMETER MATRIX

[75] Inventor: David W. Stowe, Buffalo Grove, Ill.

[73] Assignee: Gould Inc., Rolling Meadows, Ill.

[21] Appl. No.: 508,762

[22] Filed: Jun. 28, 1983

Related U.S. Application Data

[63] Continuation-in-part of Ser. No. 340,672, Jan. 19, 1982, Pat. No. 4,418,981.

[51] Int. Cl.³ .......................... G02B 5/172; G01B 9/02
[52] U.S. Cl. .................... 350/96.15; 350/96.29; 356/345
[58] Field of Search ............... 350/96.12, 96.13, 96.15, 350/96.16, 96.20, 96.21, 96.29, 96.14; 356/345, 359, 360

[56] References Cited

U.S. PATENT DOCUMENTS

| | | | |
|---|---|---|---|
| 4,136,929 | 1/1979 | Suzaki | 350/96.15 |
| 4,302,071 | 11/1981 | Winzer | 350/96.20 |
| 4,418,981 | 12/1983 | Stowe | 350/96.15 |
| 4,444,458 | 4/1984 | Stowe et al. | 350/96.15 |

Primary Examiner—John Lee
Attorney, Agent, or Firm—John R. Garett; Kay H. Pierce; Edward E. Sachs

[57] ABSTRACT

An optical interferometer matrix is described which includes a reference waveguide for optically transmitting a reference signal. The optical interferometer matrix further includes a signal source waveguide for optically transmitting a source signal which has been modulated with respect to the reference signal in response to an applied physical effect. The physical effect may be, for example, thermal, acoustic, hydrodynamic, electrical, electromechanical or magnetic. The reference and signal waveguides are then optically coupled to one another at two different points so that interference between the light in the waveguides occurs under two different phase conditions, with a phase difference between these conditions which approaches $\pi/2$ radians. In the preferred embodiment, the two points of optical coupling are confined in a small space so that thermal- or pressure-induced differential phase changes of light between the first and second coupling points are negligible.

8 Claims, 5 Drawing Figures

QUADRATURE FIBER-OPTIC INTERFEROMETER MATRIX

This application is a continuation-in-part of U.S. Ser. No. 340,672, for QUADRATURE FIBER-OPTIC INTERFEROMETER MATRIX, filed Jan. 19, 1982, now U.S. Pat. No. 4,418,981.

BACKGROUND OF THE INVENTION

A. Field of the Invention

The present invention relates generally to interferometric devices and more particularly to quadrature fiber-optic interferometers.

B. Description of the Prior Art

Homodyne systems are commonly used in the field of optical interferometers for measuring an environmental parameter such as pressure, temperature, force, magnetic fields, electric fields, acoustic waves, etc. A homodyne system is one in which light carried in both a signal source fiber and a reference fiber are of the same frequency. The signal source fiber is modulated by an environmental parameter to change the phase of the light traveling in the signal source fiber with respect to the reference fiber. Subsequent coupling of the signal and reference fibers produces interference between the two signals which results in a fringe pattern related to the applied physical effect. Maximum sensitivity of a homodyne interferometer is achieved when the path difference between the reference and signal fibers produced by the applied physical effect is an integral odd multiple of $\lambda/4$ where $\lambda$ is the wavelength of the light in the fiber. At these points, the interferometer has maximum sensitivity to small differential phase shifts. On the other hand, when the pathlength difference is an integral multiple of $\lambda/2$, the interferometer is least sensitive to small differential phase shifts.

One problem with the homodyne system is that the phase difference tends to drift slowly under operating conditions due to temperature changes, pressure changes, etc. Thus, the sensitivity of the interferometer is not constant for long periods of time unless a means of actively controlling, or tracking, the phase shift is provided. This is commonly done with a piezoelectric transducer to make minor adjustments in the phase difference between light in the reference fiber and the signal source fiber. While this method has been useful in the past, some disadvantages to this kind of dynamic tracking homodyne system are that it does require additional electrical circuitry which may not be desirable in some environments, and it does require additional adjustments during operation.

SUMMARY OF THE INVENTION

In view of the prior art, an object of the present invention is the provision of an interferometer matrix which does not require continuous fine adjustment during operation.

Another object of the present invention is to provide an interferometer matrix which does not require additional electrical apparatus at the monitoring site in order to function satisfactorily over relatively long periods of time.

A still further object of the invention is the provision of a quadrature interferometer which does not require adjustment after initial manufacture of the device.

A further object of the invention is the provision of a quadrature interferometer which is relatively simple to manufacture and use.

Other objects, advantages, and novel features of the present invention will become apparent from the following summary and detailed description of the invention when considered in conjunction with the accompanying drawings.

The present invention is an optical quadrature interferometer which includes a reference waveguide for optically transmitting a reference light beam. The interferometer further includes a signal source waveguide for optically transmitting a source signal which has been optically altered with respect to the reference light in response to an applied physical effect. The reference and signal source waveguides are optically coupled to one another at two points so that light transmitted in one waveguide will interfere with light in the other waveguide at the output of the device.

DETAILED DESCRIPTION OF THE PREFERRED EMBODIMENT

The present invention is a passive, quadrature detection interferometric matrix system. It is an extension of the conventional homodyne-type interferometers of the prior art. In a quadrature interferometer, maximum sensitivity is achieved when the difference in optical path between the reference signal and the signal to be monitored is an integral odd multiple of $\lambda/4$ where $\lambda$ is the wavelength in the waveguide because it is under these circumstances that the maximum sensitivity to small differential phase shifts is achieved. The phase angle of a signal can be defined as:

$$\phi = 2\pi \Delta p / \lambda \tag{1}$$

where $\Delta p$ represents the optical path difference between any two points on a fiber or between one fiber and another fiber. $\Delta p$ may be described as:

$$\Delta p = n \Delta l \tag{2}$$

where n equals index of refraction of the material through which an optical signal is traveling and $\Delta l$ equals the difference in length of the path through which the signal travels. If $\Delta p$, therefore, is an integral odd multiple of $\lambda/4$, it follows that the phase angle difference between two signals will be $\pi/2$ radians, as long as the index of refraction is the same for the material through which each optical signal passes.

Figure 1:
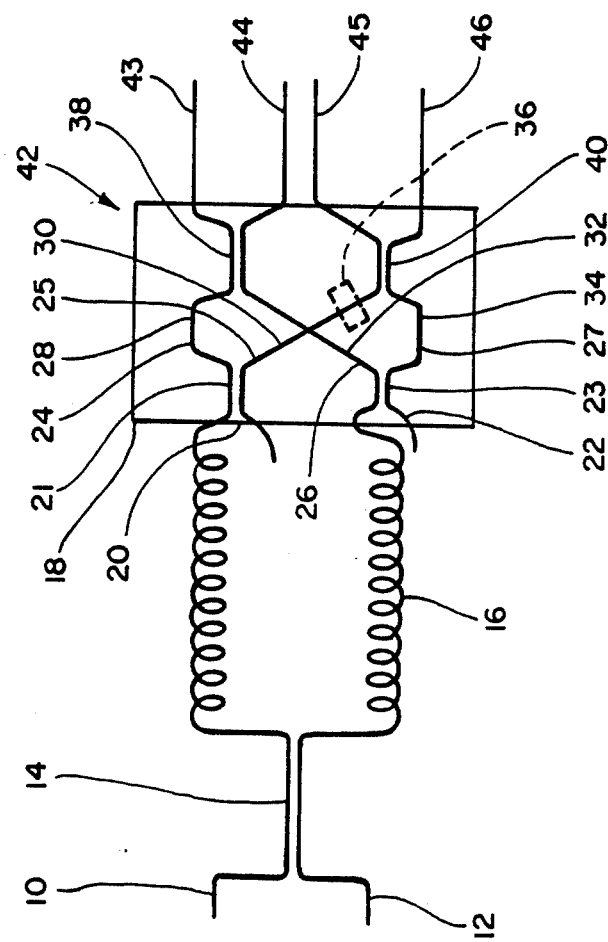
FIG. 1 is a simplified view of the present quadrature interferometer matrix indicating two coupling points in a crosswaveguide scheme.

Referring now to FIG. 1, an optical input signal may be applied to first reference waveguide 10 having a wavelength of $\lambda_r$ and a frequency $\omega_r$. The reference signal is coupled to a signal source waveguide 12 at coupling location 14. A phase differential of $\pi/2$ will be introduced at coupling location 14 between emanating signal source waveguide 12 and reference waveguide 10 according to well-known optical physics principles. The signal source waveguide may be subjected to an applied physical effect such as a thermal, acoustic, hydrodynamic, pressure, electrical or electromechanical force to induce phase modulations of the light in the signal waveguide which are typically large compared to the phase modulation of the light in the reference waveguide along waveguide 12 at location 16.

Waveguides 10 and 12 extend into housing 18. Assuming an acoustical field has been applied at location 16, the differential phase, $\theta$, between the reference and source signals in waveguides 10 and 12, respectively, can be expressed as:

$$\theta = \phi + \phi_a \sin \omega_a t$$

where $\phi$ is the (nonperiodic) differential phase drift of the system and $\phi_a$ is the amplitude of the acoustically induced phase shift at angular frequency $\omega_a$.

Once inside housing 18, waveguide 10 is coupled to third waveguide 20 at a first "preinterferometer" coupling location 21 and waveguide 12 is similarly coupled to a fourth waveguide 22 at a second preinterferometer coupling location 23. As will be obvious to one skilled in the art, a phase differential of $\pi/2$ will be introduced between the signals in waveguides 10 and 20 during coupling. A phase differential of $\pi/2$ will likewise be introduced between the signals in waveguides 12 and 22 during coupling. At locations 24-27, the waveguides extending from each of the preinterferometer coupling locations 21, 23 may be characterized in pairs as either reference-signal carrying waveguides 28, 30 or source-signal carrying waveguides 32, 34, wherein the signal in each waveguide of each pair has a phase differential from the signal in the other waveguide of each pair of $\pi/2$ just beyond the respective coupling locations.

For reasons that will become obvious from the description which follows, in the preferred embodiment, it is desirable to adjust the phase differential of either one of the waveguides in the reference-signal carrying waveguide pair 28, 30 or the source-signal carrying waveguide pair 32, 34 during manufacture by an additional $\pi/2$ phase shift. A means 36 for adjusting the phase shift of the signal in one of the waveguides by $\pi/2$ is illustrated in phantom in FIG. 1. The adjusted means 36 may include, for example, an additional incremental length of fiber, or a strained, distorted, or stretched region of fiber which is of the proper magnitude to give the desired $\pi/2$ differential phase shift.

As can be seen in FIG. 1, one of the waveguides carrying a source signal 32 is then coupled to one of the waveguides carrying a reference signal 28 at first interferometer coupling location 38. Similarly, the remaining reference and source-signal carrying waveguides 25, 34 are coupled at a second interferometer coupling location 40. Both the first and second interferometer coupling locations 38, 40 are within housing 18 and in close proximity to the first and second preinterferometer coupling locations 21 and 23 to substantially eliminate undesirable phase drift in the interferometer matrix 42 between the interferometer and preinterferometer coupling locations.

The output power from the first and second interferometer coupling locations along the waveguides at locations 43-46 for an input power $I_o$ can be calculated to be:

$$I_{43} = I_o/4(1 - \cos \theta)$$

$$I_{44} = I_o/4(1 + \cos \theta)$$

$$I_{45} = I_o/4(1 - \cos(\theta + \eta))$$

$$I_{46} = I_o/4(1 + \cos(\theta + \eta))$$

where $\theta$ = differential phase shift between the signal in waveguides 10 and 12 extending from coupling location 14; and $\eta$ = additional differential phase shift incorporated into the waveguide by phase shift adjustment means 36.

It should be recalled that the phase modulation of the signal in waveguide 12 at location 16 due to the applied physical effect may be relatively small with respect to undesired phase modulation occurring in both the signal and reference fiber due to undesirable environmental effects, such as variation in temperature or motion of the interferometer. For example, the phase modulation caused by an acoustic vibratory source on the optical reference signal may be a relatively high-frequency, low-amplitude signal superimposed on the relatively large, slowly varying modulation caused by thermal drift. Furthermore, the sensitivity to small phase shifts of the interferometer whose outputs are 43 and 44 is maximum when the interfering light from the signal and reference beam differs in phase by odd integral multiples of $\pi/2$. Alternatively, the sensitivity is minimum when said interfering light differs in phase by integral multiples of $\pi$. The sensitivity to small phase shifts of the interferometer whose outputs are 45 and 46 also varies in a similar manner with respect to the phase difference between the signal and reference light beams. However, because of the fixed $\pi/2$ differential phase shift introduced between the two interferometers during or after fabrication, the sensitivity of the first interferometer to small phase shifts will be maximum when the sensitivity of the second interferometer is minimum. Consequently, for any value of the large environmental phase drifts, at least one of the two interferometers will be sensitive to small phase shifts so the small acoustically induced phase shifts can be detected and the associated acoustic waveform can be deduced therefrom. This sensor can be used to sense any small phase shift, regardless of whether it is caused by acoustic, thermal, magnetic, electromagnetic, accelerative or other forces.

Figure 2:
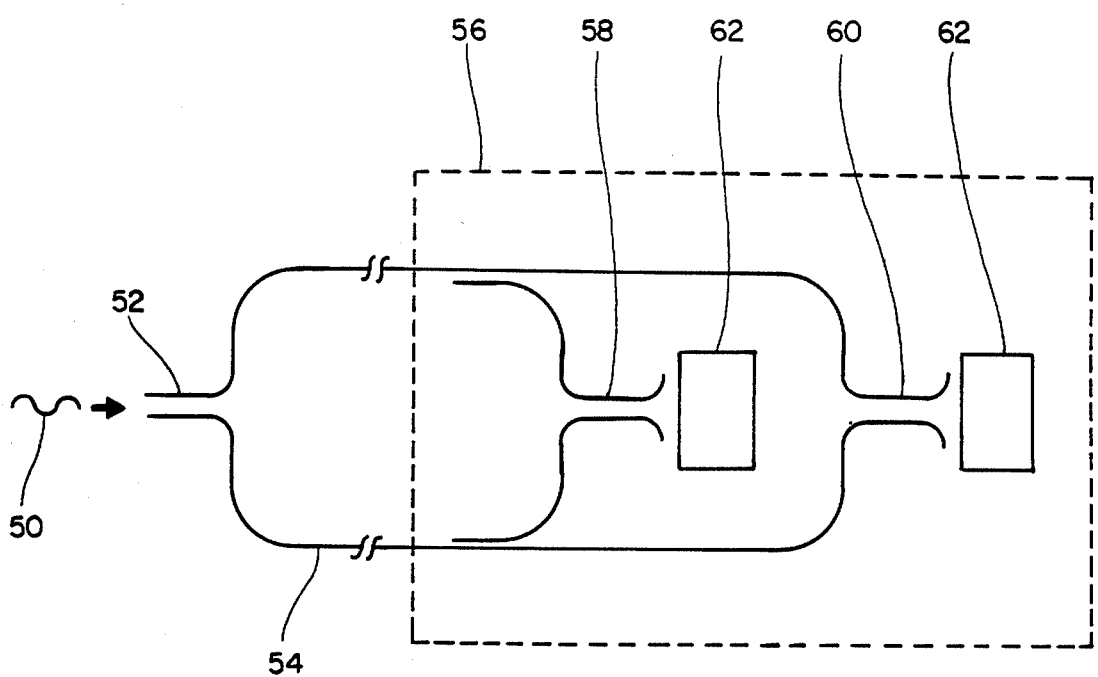
FIG. 2 is a simplified view of another embodiment of the present interferometer matrix.

Referring now to FIG. 2, which is a simplified diagram of another embodiment of the subject interferometer matrix, an optical reference signal 50 may be directed into the core of a single mode optical fiber 52. The reference signal is coupled into a second single mode optical fiber 54. The signal in fiber 54 is then subjected to an applied physical effect to create a source signal. Fibers 52 and 54 then extend into housing 56. Within the housing, a means is provided for optically coupling the source and reference signals at first and second interferometer locations 58, 60 so that the output from the first interferometer coupling location differs in phase from the corresponding output from the second interferometer coupling location by approximately $\pi/2$ radians. Although single mode optical fibers are used in this embodiment, other forms of waveguides, such as thin film or intergrated optic waveguides, may be used under other circumstances. In the embodiment illustrated in FIG. 2, there is no crossing of each of the waveguides. A means 62 for detecting light from coupling locations 58 and 60 must be provided in the housing 56.

Figure 3:
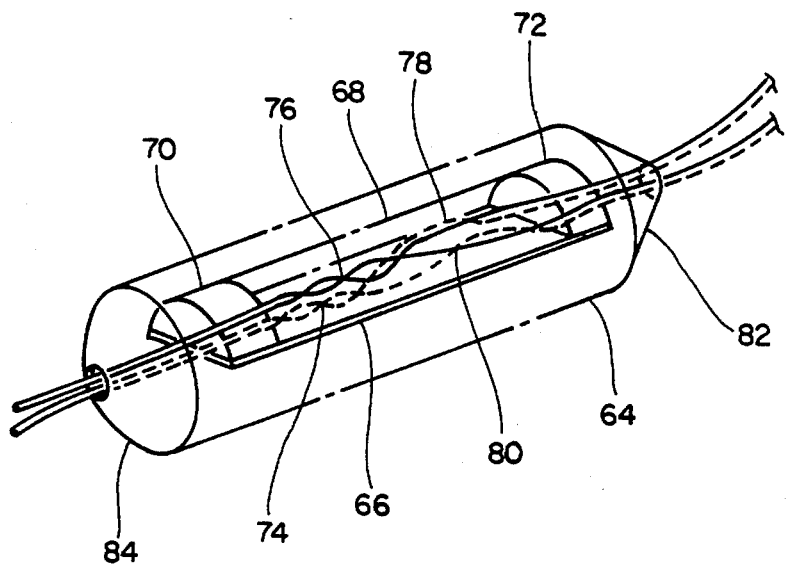
FIG. 3 is an isometric view of an embodiment of the present interferometer in which the coupled fibers are encased in an environmentally stable housing.

Referring now to FIG. 3, in one embodiment it is envisioned that the subject interferometer matrix is encased in a quartz tube 64 to provide an environment which is isothermic and isobaric. The fibers may rest on a thermally stable quartz substrate 66 and be surrounded by an elastic silicone rubber fill compound 68. A pair of epoxy end caps 70, 72 may be provided at each end of the tube to stabilize the fibers. In this embodiment, preinterferometer coupling may occur at locations 74 and 76, while interferometer coupling occurs at locations 78 and 80. Each end of a quartz tube 64 may include conical tapers 82 and 84 to provide strain relief on the fibers.

Figure 4:
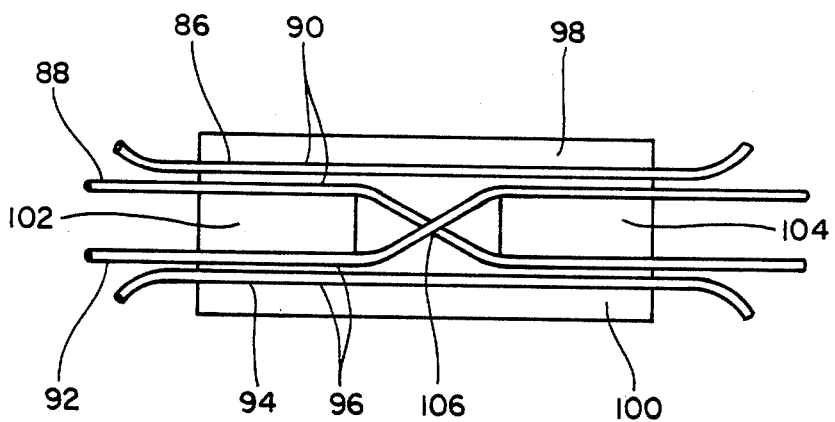
FIG. 4 is a plan view of the subject development in which the reference fibers are crossed and embedded in a substrate.

Refer now to FIG. 4, which is an embodiment in which the subject inferometer matrix is embedded in a rigid substrate. In this embodiment, a pair of reference waveguides 86, 88 are coupled at a preinterferometer coupling location 90 to couple a portion of a reference signal transmitted in waveguide 86 into waveguide 88. A pair of source waveguides 92, 94 are similarly coupled at another preinterferometer coupling location 96 to couple a portion of a source signal transmitted in waveguide 92 into waveguide 94. Waveguides 88, 92 are then crossed without the occurrence of any optical coupling therebetween. The path of waveguides 88 and 92 are adjusted during manufacture so that there is a phase difference of $\pi/2$ between the two signals. Waveguide 92 is then coupled to waveguide 86 to produce 50% transfer of optical signals therebetween. Waveguide 88 is similarly coupled to waveguide 94. In this manner, the optical outputs of the waveguides 86, 88, 92 and 94 will have the desired phase difference therebetween.

In the embodiment illustrated in FIG. 4, four separate embedding substrates may be used during manufacture. For example, a relatively long rectangular substrate 98 may be used to embed portions of waveguide 86, which will be used for both preinterferometer and interferometer coupling. Similarly, another relatively long rectangular substrate 100 may be used to embed waveguide 94. The two center waveguides 88, 92 may be embedded on opposite sides of a relatively short rectangular substrate 102 to embed those portions of the fibers which are used in preinterferometer coupling. The portions of fibers 88, 92, which are used for interferometer coupling, are embedded on opposite sides of a similarly shaped substrate 104. Fibers 88, 86, 92 and 94 may be etched or polished to a core area after embedding and then substrates 98, 100, 102 and 104 may be heated to form a bond therebetween so that the fibers will have the configuration shown in FIG. 4.

The fibers may be embedded in a rigid support material by heating the fiber and the rigid support material so that a molecular interface is formed between the two. The molecular interface may be formed by a fusion-type process when the support material has a melting point much lower than that of the fiber. For example, during fabrication of a rigidly supported fiber, the support material and fiber may be heated so that the support material readily deforms about the fiber and only partial liquification, if any at all, of the fiber occurs. For example, if a single-mode optical fiber having an outer cladding which is relatively free of boron prior to bonding is used as the waveguide to be embedded and a material such as Corning Code 7070 glass having a diffusible constituent of boron is used as the substrate, the 7070 glass may be molded about the optical fiber to create a bond between the two, such that boron from the substrate material has diffused into the cladding of the optical fiber by a width of several angstroms.

In those embodiments in which the optical fibers are embedded in a substrate, a variety of substrate materials may be used. As previously noted, it is preferable to have a substrate which has a substantially lower melting point than the melting point of the fiber. However, the desired difference in melting points of the fiber and the substrate varies with the difference in coefficient of thermal expansion of the specific type of optical fiber and substrate used. The closer the coefficients of thermal expansion are between the two materials, the less critical it becomes to have substantial differences between the melting points of the two materials. For example, it is possible to embed a doped fused-silica optical fiber having a melting point of approximately 1600° C. and a coefficient of thermal expansion of $5 \times 10^{-7}$/°C. into a Corning Code 7740 glass substrate having a melting point of approximately 800° C. and a coefficient of thermal expansion of $32.5 \times 10^{-7}$/°C. Similarly, it may also be possible to fuse the same optical fiber to a Corning Code 7070 glass substrate having a melting point of approximately 750° C. and a coefficient of thermal expansion of $32 \times 10^{-7}$/°C.

Once the fiber has been embedded in the substrate, the fiber then may be etched or polished to the core of the fiber along the portions of the fiber in which it is desired to couple the fiber to another fiber. For the configuration shown in FIG. 4, a plurality of fibers may be embedded in a plurality of substrates and then etched or polished to expose a core area. The exposed cores of the optical fibers may then be placed in close proximity to one another to form a coupling assembly in which light from one fiber may be optically coupled into another fiber. The coupling assembly may be heated so as to allow the plurality of substrates to bond with one another to form a rigid coupling assembly. During the assembly process, it may be desired to fill any open areas in the assembly, such as area 106, with a gel or other substance to provide support for those portions of the fibers which are not directly embedded into a substrate.

Figure 5:
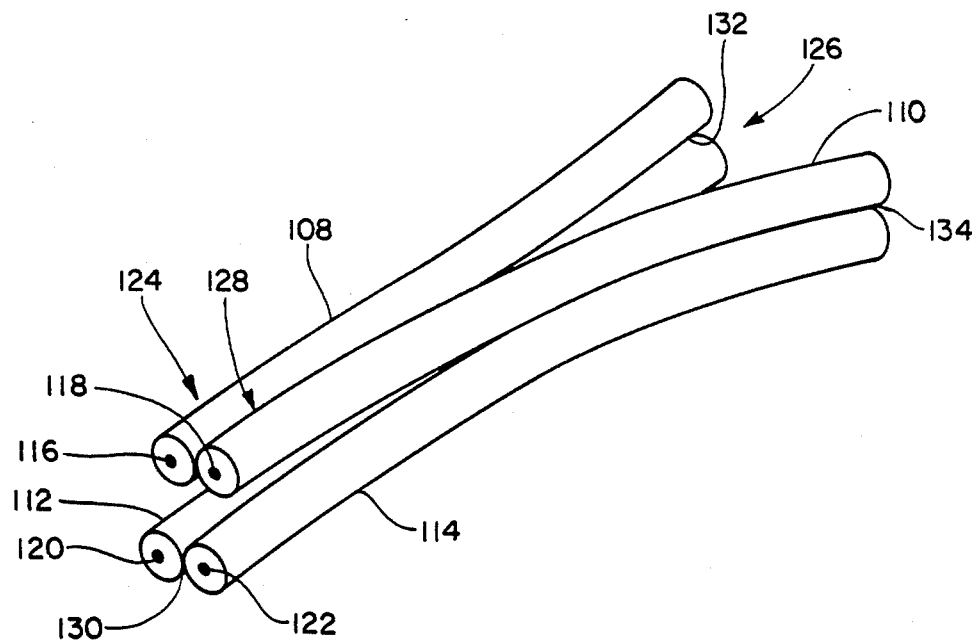
FIG. 5 is an isometric view of an improved geometric configuration of the quadrature interferometer matrix.

FIG. 5 illustrates an improved geometric configuration of the present quadrature interferometer. In this configuration, first, second, third, and fourth optical fibers 108, 110, 112, 114 are used. Each fiber 108–114 has a central axis 116, 118, 120, 122. Each fiber also has a longitudinally extending portion of substantially equal lengths with respect to the longitudinally extending portions of the other fibers. Each portion has a light-entrance end designated generally as 124 and a light-exit end designated generally as 126. The first fiber 108 receives modulated light at its light-entrance end 124. The third fiber receives a reference light signal at its light-entrance end 124. The first and second fibers 108 and 110 are coupled to one another toward the light-entrance end 124 to allow the modulated signal to be coupled into the second fiber 110. The third fiber 112 is coupled into the fourth fiber 114 toward the entrance end 124 to allow the reference signal to be coupled in the fourth fiber 114. At the opposite end of the interferometer, the first and third fibers 108, 112 are coupled together toward the exit end 126 and the second and fourth fibers 110, 114 are coupled together toward the exit end 126. In this manner, the modulated signal in the first, second, third and fourth fibers are generally maintained in parallel juxtaposition with one another along the longitudinally extending portions so that the central axis 116, 118, 120, 122 of each fiber defines the corners of a rectangle in a plane perpendicular to the longitudinally extending portions.

In one embodiment, the first and second fibers are fused to one another toward the entrance end, and the third and fourth fibers are fused to one another toward the entrance end. In a similar manner, the first and third fibers are fused to one another toward the exit end 126 and the second and fourth fibers are also fused to one another toward the exit end 126. Coupling occurs between the fibers along the longitudinally extending portions which are fused together in this embodiment.

The present invention further comprehends a method of making the quadrature interferometer matrix illustrated in FIG. 5. The method includes the steps of maintaining longitudinally extending segments of the fibers in substantially parallel juxtaposition with one another. The first and second fibers 108, 110 are fused together toward a first end 124 of the longitudinally extending segments to form a first optical coupler 128. Similarly, the third and fourth fibers 112, 114 are fused together toward the first end 124 of the longitudinally extending segments to form the second optical coupler 130. In a similar manner, the first and third fibers are fused together to form a third optical coupler 132 and the second and fourth optical fibers are fused together to form a fourth optical coupler 134 at the second end 126 of the longitudinally extending segments.

The present invention comprehends that the first and second optical couplers 128, 130 may be formed simultaneously. It is also comprehended that the third and fourth optical couplers 132, 134 may be formed simultaneously. In one embodiment of the method of making the fiber interferometer matrix illustrated in FIG. 5, it is comprehended that the fibers may be maintained in axial tension during the fusing steps.

The two dimensional rectangular arrangement illustrated in FIG. 5 allows the four couplers to be configured within the passive quadrature demodulator matrix with minimal bends and minimal distance between the couplers. These properties are important for minimizing variations of the passive quadrature demodulator phase with temperature, polarization, and source wavelength. The fusion process was attractive for fabricating the interferometer because the process is relatively insensitive to temperature. It is envisioned that the fibers may be fused together and simultaneously drawn until the desired coupling ratio is achieved. In the preferred embodiment, the first and second couplers are fabricated simultaneously and then the third and fourth couplers are similarly fabricated. Using this technique, couplers have been manufactured with less than 5% loss in coupling ratios of 50% (plus or minus 10%). In one embodiment, the distance between the coupler pairs was on the order of three centimeters. The fiber optic interferometer may be packaged by epoxying the matrix illustrated in FIG. 5 to a quartz slab which is subsequently encapsulated in a 5 centimeter long quartz tube. The phase error of the couplers may be adjusted by slightly bending or tensioning the fibers as the epoxy is cured. The bending of the fibers in this manner enabled adjustment of the interferometer phase between the couplers without introducing sufficient birefringence to cause detrimental polarization effects.

A strength of the subject interferometer matrix over a conventional homodyne approach is that it eliminates the need for a conventional dynamic phase tracker during operation. As previously discussed, a dynamic phase tracker adds to the electrical and mechanical complexity of the homodyne system and may lessen its reliability. Furthermore, since the subject development requires no phase tracker, the subject development is totally optical in the phase-coherent portion of the interferometer, thus offering the potential of remote optical sensing without the need for electrical power in the sensing region.

Although the invention has been described and illustrated in detail, it is to be clearly understood that the same is by way of illustration and example only, and is not to be taken by way of limitation; the spirit and scope of this invention being limited only by the terms of the appended claims.

I claim:

1. A fiber optic interferometer for monitoring phase modulation of a modulated light signal with respect to a reference light signal, comprising:

first, second, third, and fourth optical fibers (108, 110, 112, 114) each having a central axis (116, 118, 120, 122) and each having longitudinally extending portions of substantially equal lengths with respect to one another, each portion having a light-entrance end (124) and a light-exit end (126), said first fiber (108) receiving said modulated light at its light-entrance end (124), said third fiber (112) receiving said reference light signal at its light-entrance end (124), said first and second fibers (108, 110) being coupled to one another toward said light-entrance end (124) to allow said modulated signal to be coupled into said second fiber (110), said third fiber (112) being coupled to said fourth fiber (114) toward said entrance end (124) to allow said reference signal to be coupled into said fourth fiber (114), said first and third fibers (108, 112) being coupled together toward said exit end (126), and said second and fourth fibers (110, 114) being coupled together toward said exit end (126) to allow said modulated signal in said first and second fibers (108, 110) to be coupled with said reference signal in said third and fourth fibers (112, 114) respectively, said first, second, third, and fourth fibers (108, 110, 112, 114) being situated in generally parallel juxtaposition with one another along said longitudinally extending portions so said central axis (116, 118, 120, 122) of each fiber defines the corners of a rectangle in a plane perpendicular to said longitudinally extending portions.

2. A fiber optic interferometer as recited in claim 1, wherein said first and second fibers (108, 110) are fused to one another toward said entrance end (124), and said third and fourth (112, 114) fibers are fused to one another toward said entrance end (124).

3. A fiber optic interferometer as recited in claim 1, wherein said first and third fibers (108, 112) are fused to one another toward said exit end (126) and said second and fourth fibers (110, 114) are fused to one another at said exit end (126).

4. A method of making a fiber optic interferometer from first, second, third, and fourth optical fibers (108, 110, 112, 114), each fiber having substantially identical longitudinally extending segments, comprising the steps of:

maintaining said longitudinally extending segments in substantially parallel juxtaposition with one another;

fusing said first and second fibers (108, 110) together toward a first end (124) of said longitudinally extending segments to form a first optical coupler (128);

fusing said third and fourth fibers (112, 114) together toward said first end (124) of said longitudinally extending segments to form a second optical coupler (130);

fusing said first and third optical fibers (108, 112) together toward a second end (126) of said longitudinally extending segments to form a third optical coupler (132); and fusing said second and fourth optical fibers (110, 114) together toward said second end (126) of said lontigudinally extending segments for form a fourth optical coupler (134).

5. A method of making a fiber optic interferometer as recited in claim 4, wherein said first and second optical couplers (128, 130) are formed simultaneously.

6. A method of making a fiber optic interferometer as recited in claim 5, wherein said third and fourth optical couplers (132, 134) are formed simultaneously.

7. A method of making a fiber optic interferometer as recited in claim 4, wherein said third and fourth optical couplers (132, 134) are formed simultaneously.

8. A method of making a fiber optic interferometer as recited in claim 4, comprising the additional step of:

maintaining said fibers in axial tension during said fusing steps.

* * * * *